United States Patent
Thanner et al.

(10) Patent No.: US 10,761,925 B2
(45) Date of Patent: Sep. 1, 2020

(54) MULTI-CHANNEL NETWORK-ON-A-CHIP

(71) Applicant: Freescale Semiconductor, Inc., Austin, TX (US)

(72) Inventors: Manfred P. Thanner, Neubiberg (DE); Stephan G. Mueller, Taunusstein (DE); Alexandre P. Palus, Austin, TX (US); Anthony M. Reipold, Austin, TX (US)

(73) Assignee: NXP USA, Inc., Austin, TX (US)

( * ) Notice: Subject to any disclaimer, the term of this patent is extended or adjusted under 35 U.S.C. 154(b) by 198 days.

(21) Appl. No.: 14/666,733

(22) Filed: Mar. 24, 2015

(65) Prior Publication Data
US 2016/0283314 A1    Sep. 29, 2016

(51) Int. Cl.
*G06F 11/16* (2006.01)
*G06F 11/07* (2006.01)

(52) U.S. Cl.
CPC ........ *G06F 11/0793* (2013.01); *G06F 11/073* (2013.01); *G06F 11/0796* (2013.01); *G06F 11/165* (2013.01); *G06F 11/1625* (2013.01); *G06F 11/1629* (2013.01); *G06F 11/1641* (2013.01); *G06F 11/1695* (2013.01); *G06F 2201/845* (2013.01)

(58) Field of Classification Search
CPC ............... G06F 11/1641; G06F 11/165; G06F 11/2043; G06F 11/004; G06F 11/167; G06F 11/2028; G06F 11/1629; H04L 69/40
See application file for complete search history.

(56) References Cited

U.S. PATENT DOCUMENTS

| | | | | |
|---|---|---|---|---|
| 4,365,332 A | * | 12/1982 | Rice | G06F 11/1008 365/1 |
| 5,295,258 A | * | 3/1994 | Jewett | G06F 1/12 714/12 |
| 5,452,443 A | * | 9/1995 | Oyamada | G06F 11/0757 714/10 |
| 5,574,922 A | * | 11/1996 | James | G06F 9/526 710/200 |
| 5,604,755 A | * | 2/1997 | Bertin | G06F 11/073 714/764 |
| 5,774,640 A | * | 6/1998 | Kurio | G06F 11/2005 714/4.3 |
| 5,838,894 A | * | 11/1998 | Horst | G01R 31/31727 709/239 |
| 5,892,897 A | * | 4/1999 | Carlson | G06F 11/1641 714/31 |
| 5,915,082 A | * | 6/1999 | Marshall | G06F 11/10 714/11 |

(Continued)

OTHER PUBLICATIONS

Arteris FlexNoC Resilience Package IP, "Address Increasing Complexity," 2015, 2 pages.

(Continued)

*Primary Examiner* — Loan L. T. Truong (57) ABSTRACT

In at least one embodiment of the disclosure, a method includes detecting an error in a local memory shared by redundant computing modules executing in delayed lockstep. The method includes pausing execution in the redundant computing modules and handling the error of the local memory. The method includes resuming execution in delayed lockstep of the redundant computing modules in response to the handling of the error.

21 Claims, 5 Drawing Sheets

(56) References Cited

U.S. PATENT DOCUMENTS

| | | | | |
|---|---|---|---|---|
| 6,047,388 A * | 4/2000 | Bashore | G06F 12/1441 | 711/E12.101 |
| 6,199,171 B1 * | 3/2001 | Bossen | G06F 11/1474 | 714/12 |
| 6,604,177 B1 * | 8/2003 | Kondo | G06F 11/1641 | 711/150 |
| 7,036,059 B1 * | 4/2006 | Carmichael | G06F 11/1004 | 714/725 |
| 7,210,111 B1 * | 4/2007 | Smith | G06F 30/3312 | 716/108 |
| 7,320,114 B1 * | 1/2008 | Jain | G06F 11/261 | 714/47.1 |
| 7,328,371 B1 * | 2/2008 | Kalyanasundharam | G06F 11/1641 | 712/22 |
| 7,502,969 B2 * | 3/2009 | Beard | G06F 17/5022 | 714/25 |
| 7,516,025 B1 * | 4/2009 | Williams | G05B 23/0278 | 702/182 |
| 7,669,079 B2 * | 2/2010 | Weiberle | G06F 9/30076 | 714/10 |
| 7,730,350 B2 * | 6/2010 | Southgate | G06F 11/1691 | 710/244 |
| 7,743,285 B1 * | 6/2010 | Aggarwal | G06F 11/1658 | 714/43 |
| 7,747,932 B2 * | 6/2010 | Racunas | G06F 11/1641 | 714/12 |
| 7,818,614 B2 * | 10/2010 | Michaelis | G06F 11/165 | 714/10 |
| 8,090,984 B2 * | 1/2012 | Moyer | G06F 11/1641 | 700/78 |
| 8,443,230 B1 * | 5/2013 | James-Roxby | G06F 11/1641 | 714/11 |
| 8,589,737 B2 | 11/2013 | Rohleder et al. | | |
| 8,650,440 B2 | 2/2014 | Rohleder et al. | | |
| 8,819,485 B2 * | 8/2014 | Vilela | G06F 11/0763 | 714/11 |
| 8,935,569 B2 | 1/2015 | Kabulepa et al. | | |
| 8,935,679 B2 | 1/2015 | Morrison et al. | | |
| 9,065,706 B2 * | 6/2015 | Koinuma | G06F 11/0724 | |
| 9,069,953 B2 * | 6/2015 | Bellocchio | G06F 21/55 | |
| 9,110,768 B2 * | 8/2015 | Iacobovici | G06F 7/72 | |
| 9,146,835 B2 * | 9/2015 | Bellows | G06F 11/366 | |
| 9,317,379 B2 * | 4/2016 | Gschwind | G06F 11/1474 | |
| 9,417,946 B2 * | 8/2016 | Vilela | G06F 11/1654 | |
| 9,678,864 B2 * | 6/2017 | Cai | G06F 11/1016 | |
| 9,870,253 B2 * | 1/2018 | Gschwind | G06F 9/466 | |
| 2002/0087925 A1 * | 7/2002 | Hayden | G06F 13/1663 | 714/718 |
| 2004/0111591 A1 * | 6/2004 | Arimilli | G06F 9/30116 | 712/228 |
| 2004/0158680 A1 * | 8/2004 | Hooker | G06F 9/30047 | 711/137 |
| 2004/0158682 A1 * | 8/2004 | Hooker | G06F 9/30047 | 711/144 |
| 2004/0260877 A1 * | 12/2004 | Hooker | G06F 12/0815 | 711/118 |
| 2005/0240811 A1 * | 10/2005 | Safford | G06F 11/1679 | 714/11 |
| 2005/0240829 A1 * | 10/2005 | Safford | G06F 11/0724 | 714/43 |
| 2005/0283712 A1 * | 12/2005 | Mukherjee | G06F 9/3865 | 714/764 |
| 2006/0085605 A1 * | 4/2006 | Guthrie | G06F 9/3004 | 711/141 |
| 2006/0107114 A1 * | 5/2006 | Michaelis | G06F 11/0721 | 714/25 |
| 2006/0212677 A1 * | 9/2006 | Fossum | G06F 1/3237 | 712/1 |
| 2008/0141060 A1 * | 6/2008 | Matsumoto | G06F 1/12 | 713/401 |
| 2008/0229134 A1 * | 9/2008 | Bose | G06F 9/30189 | 713/375 |
| 2008/0244305 A1 * | 10/2008 | Troppmann | G06F 11/1641 | 713/601 |
| 2009/0157981 A1 * | 6/2009 | Kinter | G06F 9/30047 | 711/141 |
| 2009/0177866 A1 * | 7/2009 | Choate | G06F 11/1641 | 712/200 |
| 2010/0146335 A1 * | 6/2010 | Moyer | G06F 11/1687 | 714/25 |
| 2010/0281239 A1 * | 11/2010 | Sudhakar | G06F 9/3891 | 712/222 |
| 2010/0318991 A1 * | 12/2010 | Venkitachalam | G06F 9/45533 | 718/1 |
| 2011/0231697 A1 * | 9/2011 | Berke | G06F 11/004 | 714/3 |
| 2012/0047351 A1 * | 2/2012 | Morrison | G06F 11/1405 | 712/208 |
| 2012/0210162 A1 * | 8/2012 | Gara | G06F 11/1064 | 714/6.1 |
| 2013/0019083 A1 * | 1/2013 | Cain, III | G06F 11/1492 | 712/203 |
| 2013/0024721 A1 * | 1/2013 | Kabulepa | G06F 11/1641 | 714/5.1 |
| 2013/0179720 A1 * | 7/2013 | Bellows | G06F 11/366 | 713/401 |
| 2013/0238945 A1 * | 9/2013 | Vilela | G06F 11/1654 | 714/49 |
| 2013/0308433 A1 * | 11/2013 | Yulizar | G11B 27/36 | 369/53.41 |
| 2014/0115389 A1 * | 4/2014 | Fan | G06F 11/073 | 714/15 |
| 2014/0122810 A1 * | 5/2014 | Bhoria | G06F 12/0891 | 711/144 |
| 2014/0258684 A1 * | 9/2014 | Hastie | G06F 11/0793 | 712/216 |
| 2015/0212906 A1 * | 7/2015 | Gschwind | G06F 3/0673 | 714/15 |
| 2019/0303260 A1 * | 10/2019 | Ozer | G06F 11/2236 | |

OTHER PUBLICATIONS

Probell, Jonah, et al., "SoC Reliability Features in the FlexNoC Resilience Package, A complimentary IP package for use with Arteris FlexNoC IP," Arteris Inc., 2014, pp. 1-2.

Radetzki, Martin, et al., "Fault Tolerance in Networks on Chip," Scholarly Paper, Apr. 25, 2012, downloaded from jantsch.se/AxelJantsch/presentations/2012/FTNOC-Tutorial-AllSlides.pdf, 109 pages.

* cited by examiner

MULTI-CHANNEL NETWORK-ON-A-CHIP

FIELD OF THE INVENTION

This disclosure relates to electronic devices and more particularly to fail-safe electronic devices.

DESCRIPTION OF THE RELATED ART

Safety requirements for exemplary applications international Standard IEC 61508 Safety integrity Levels used for automotive applications) require fail-safe electronics systems that prevent or mitigate unsafe consequences in response to detection of a system malfunction. Accordingly, system-on-a-chip (SoC) solutions are increasingly aware of safety issues. Timely detection of system failures allows an SoC to handle such faults or to configure the system in a safe state. However, such behavior typically results in a reduced availability of the system or a portion of the system, which may be undesirable. Accordingly, improved fail-safe processing techniques are desired.

BRIEF DESCRIPTION OF THE DRAWINGS

The present invention is illustrated by way of example and is not limited by the accompanying figures, in which like references indicate similar elements. Elements in the figures illustrated for simplicity and clarity and have not necessarily been drawn to scale.

The use of the same reference symbols in different drawings indicates similar or identical items.

DETAILED DESCRIPTION

A fail-operational execution technique increases availability of a system using delayed lockstep execution by redundant channels including redundant processors that share local memory. Each of redundant channel detects errors in the local memory. The technique pauses execution in the redundant processors, corrects the errors in the local memory, and resumes execution, without a system reset. The fail-operational execution technique increases system availability as compared to a conventional systems including redundant local memory executing in lockstep going to a fail-safe configuration. The fail-operational execution technique does not trigger a system reset to handle synchronization errors in response to errors in local memory, and thus, has a reduced performance penalty to errors in the local memory. As referred to herein, errors include permanent errors in a device and soft errors in the device, which are random data errors caused by external stimulus (e.g., errors due to electromagnetic interference, alpha particles, or voltage spikes) that do not damage the device. The fail-operational technique may include communicating using a redundant network-on-a-chip (NoC) to increase a Safety Integrity Level of the system. The fail-operational system may also include non-redundant NoC and processing modules coupled to the redundant NoC.

Figure 1:
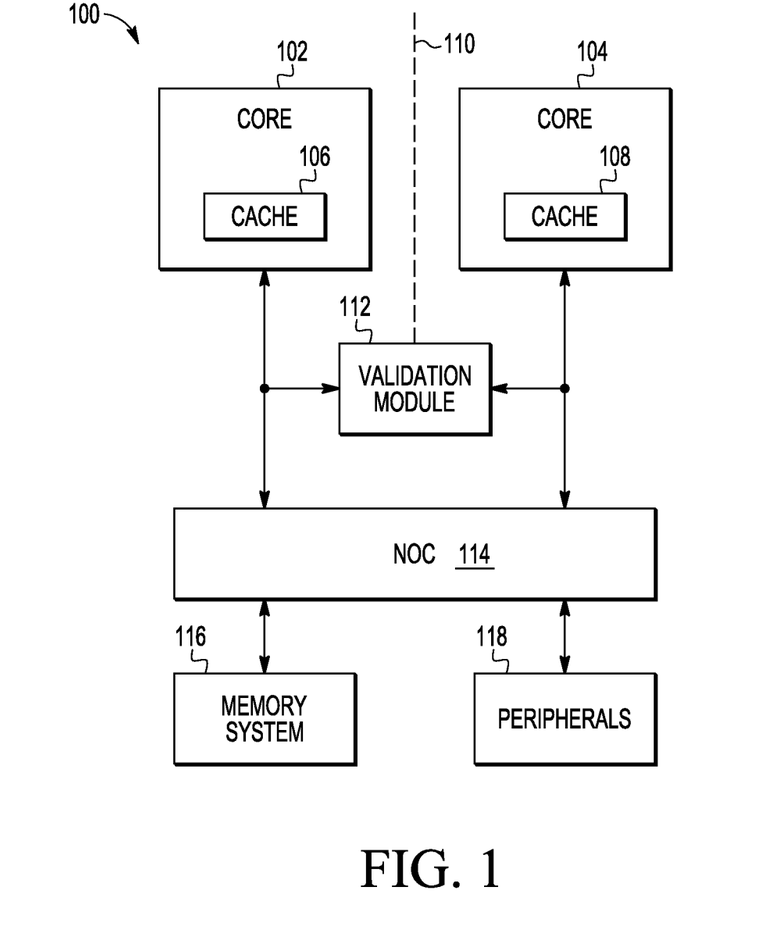
FIG. 1 illustrates a functional block diagram of an exemplary fail-safe computing system.

Referring to FIG. 1, a prior art fail-safe system 100 includes core 102 and core 104, which are redundant computing elements configured to execute instructions concurrently in lockstep. As referred to herein, redundant computing elements that execute instructions concurrently in lockstep receive the same instructions and state information and therefore execute the same operations. In at least one embodiment, core 102 operates as a master core and core 104 operates as a verification core. Cores 102 and 104 may be a general purpose microprocessor core, microcontroller, digital signal processor, aphids processing unit, application specific computing module, or other suitable computing module. The outputs of operations of the two cores are compared and validated, e.g., on a cycle-by-cycle basis, by validation module 112. The cores perform concurrent local memory accesses, both cores addressing the same memory content, which is stored redundantly in cache 106 and cache 108. Fail-safe system 100 includes network 114, which couples core 102 and core 104 to memory system 116 and peripherals 118. Network-on-a-chip 114 may include crossbar switches and protocol conversion modules. To reduce the likelihood that core 102 and core 104 experience common failures due to common interference, core 102 is isolated from core 104 by physical barrier 110. Physical barrier may be a substantial distance on an integrated circuit substrate, e.g., core 102 is physically located at one side of the integrated circuit substrate while core 104 is physically located at another side of the integrated circuit although other physical isolation techniques may be used.

Physical isolation of core 102 and core 104 requires local memory (e.g., cache memory) to also be duplicated in or near core 102 and in or near core 104 to reduce the latency of local memory accesses and to reduce excessive routing that would otherwise be required. As referred to herein, local memory includes the fastest form of storage used by a core or other computing module for temporary storage of instructions or data and is typically closest to the core or is integrated within the core. Communication with the local memory does not require communications using an NoC, but rather, only local connections. The local memory may be a register file or a cache. A register file may be considered the smallest, fastest cache in the system, with the special characteristic that it is scheduled in software (e.g., by a compiler), which allocates registers to hold values retrieved from main memory. A cache is used to reduce the average time to access data from a main memory and stores copies of data from frequently used main memory locations. In a system that implements a multi-level caching scheme, the local memory may include a level-one cache or, in some embodiments, one or more higher level cache. In conventional multi-core computing applications, sharing a level-one cache amongst cores is undesirable since such sharing typically increases latency. The local memory may be split into multiple portions, e.g., one for instructions and one for data, or may be a unified storage structure that stores both instructions and data. The local memory may be implemented using static random-access memory (SRAM).

By duplicating the local memory and physically isolating the redundant local memories from each other, those local memories may experience different errors. For example, cache 106 may experience a soft error due to electromagnetic interference that changes a bit in a line of cache 106 from the corresponding bit in a redundant line of cache 108. In general, such soft errors in local memory are easily correctible. When that erred bit is accessed by core 102 (e.g., in a read or commit to main memory operation initiated by a cache controller of core 102), core 102 detects the error (e.g., using error correction codes (ECC) or other suitable technique). In response to detecting the error in cache 106, core 102 executes an error handling routine that may further identify a location of the soft error (e.g., using MBIST) and handles the soft error (e.g., by invalidating a corresponding line of cache 106 or correcting the associated bit). However, detection and handling of the soft error consumes time (e.g., microseconds).

Meanwhile, core 104 does not experience the error and continues to execute instructions. As a result, cores 102 and 104 lose synchronization. Validation module 112 detects the loss of synchronization based on differences in the outputs of the core 102 and core 104. An exemplary validation module 112 includes registers to store results from cores 102 and 104 and logic to compare those results and generate indications or errors. In general, validation module 112 sends an error indication to core 102 and core 104. The error indicator may trigger an interrupt in cores 102 and 104. That interrupt routine may halt instruction execution. Although the error handling routine may identify the lockstep error as a false failure resulting from loss of lockstep due to correction of a soft error, the error handling routine will trigger a reset of the system, which consumes a substantial amount of time (e.g., milliseconds). During the error handling and restart, the functions provided by core 102 and core 104 are unavailable to the system. For example, in an exemplary automotive application (e.g., an automotive braking system), the overall system may continue operation in a fail-safe mode (e.g., using conventional braking), but without the function being provided by cores 102 and 104 (e.g., anti-lock braking) for the substantial amount of time.

A technique that reduces the unavailability of a system due to errors in local memory shares local memory between redundant cores isolated using delayed lockstep execution. Rather than using physical isolation between the redundant cores, delayed lockstep execution provides isolation in time from common errors induced by external influences (e.g., errors due to electromagnetic interference or voltage spikes) and facilitates collocation of the cores and the shared local memory. To reduce any latency introduced by sharing local memory, the cores may be collocated with the shared local memory or otherwise located in close proximity to each other and to the shared local memory.

Figure 2:
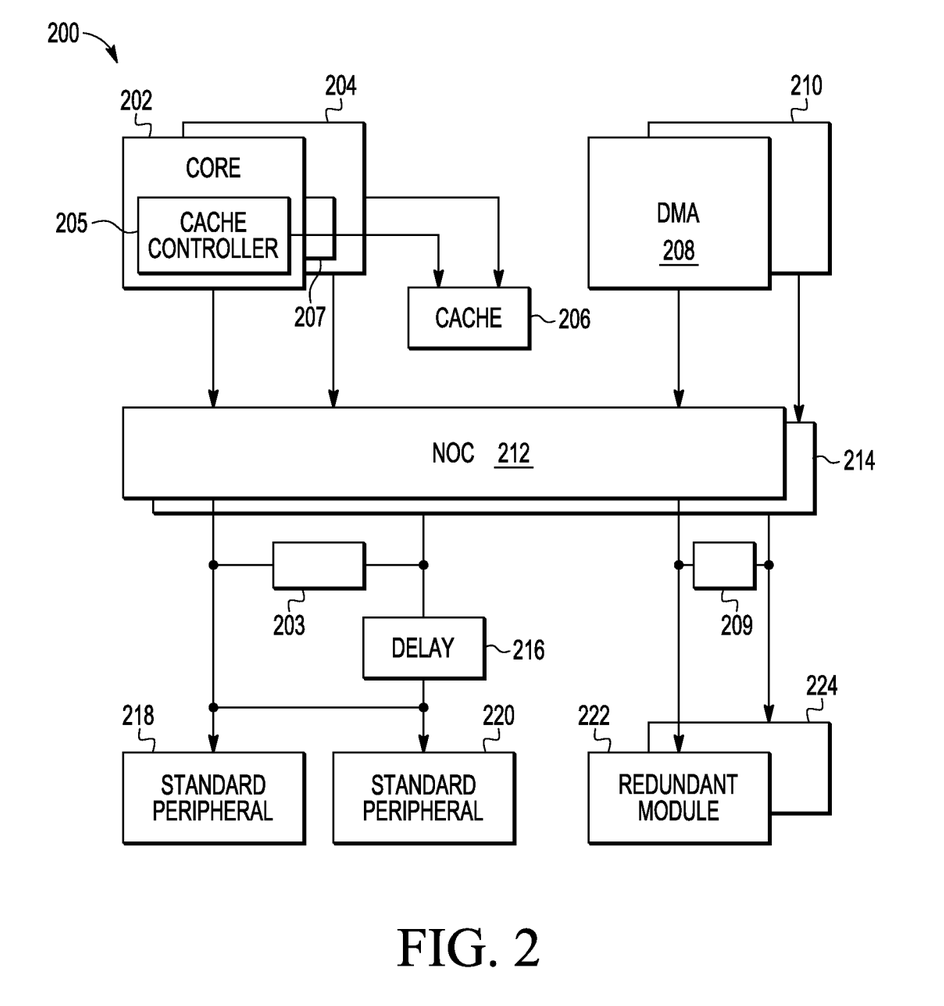
FIG. 2 illustrates a functional block diagram of an exemplary fail-operational computing system including a shared local memory consistent with at least one embodiment of the invention.

Referring to FIG. 2, dual channel fail-operational system 200 includes redundant cores 202 and 204 configured for delayed lockstep execution, in accord with embodiments of the present invention. That is, cores 202 and 204 receive the same instructions and execute the same set of operations in parallel, but the corresponding instructions execute offset by a predetermined delay (e.g., a plurality of clock cycles). In at least one embodiment of dual channel fail-operational system 200, core 202 executes as a primary core and core 204 is a secondary core that executes operations at a predetermined number of clock cycles after core 202. The set of results generated by each operation being performed by each core may be committed to memory as an atomic transaction after validation module 203 compensates for the delay in execution between the two cores (e.g., by storing and delaying results of the leading core for comparison with corresponding results of the lagging core) anal validates the results. Validation module 203 compares corresponding results from each core and generates an indicator of the comparison. That indicator may be used by logic in validation module 203 or by logic in cores 202 and 204 to determine whether or not to commit the results to memory or a fault has occurred. Similarly, validation module 209 compares corresponding results from DMA 208 and DMA 210 and generates an indicator of the comparison. That indicator may be used by logic in validation module 209 or by logic in DMA 208 and DMA 210 to determine whether or not to commit the results to redundant modules 222 and 224, or a fault has occurred.

Core 202 and core 204 include cache controllers 205 and 207, respectively, which control traffic between the corresponding cores and local memory 206, Cache controllers 205 and 207 may implement error-detecting codes (EDC), error-correcting codes (ECC) (e.g., Reed-Solomon codes or other suitable ECC code), parity bits, or a combination thereof and one or more associated error correction algorithm. Both EDC and ECC may use code checking mechanisms, such as a cyclic redundancy check (CRC) checksum, where the CRC checksum is stored along with the actual data, to identify (and sometimes correct) erroneous data content. Typical codes can only correct a certain number of bit errors and only detect further numbers of bit errors. The correct value is then used by the corresponding core. If no additional information is available, the cache controller may set an error flag or trigger an interrupt in the corresponding core. When there is no error, the corresponding data is used by the requesting core.

In at least one embodiment of dual channel fail-operational system 200, other modules are duplicated and executed in delayed lockstep, e.g., DMA controller 208, which may be used for allowing access to memory during real-time applications, backing up state information or other data from the core to main memory, allowing access to the main memory for intra-chip data transfer when cores 202 and 204 are integrated in a multi-core processor system, or other memory operations, while cores 202 and 204 perform other operations. Network-on-a-chip 214 provides redundancy to NoC 212 and is coupled to secondary elements, e.g., core 204 and DMA 210. Core 202 and core 204 may form two separate channels working concurrently in delayed lock-step mode, whereby corresponding operations of the two systems are compared and validated on a cycle-by-cycle basis. Cores 202 and 204 are coupled to dual channel data paths, which increases the safety integrity level of the system. The two separate systems may perform two concurrent memory accesses, both systems addressing the same memory content, which is stored redundantly. Note that in other embodiments of dual channel fail-operational system 200, only cores 202 and 204 are redundant and only the primary core (e.g., core 202) injects messages into NoC 212 to one of target peripherals 218 and 220 or to one of redundant blocks 222 and 224 (which may include redundant system memory, redundant input/output modules, or other redundant peripheral modules). Delay element 216 provides a delay to communications between standard peripheral 218 or standard peripheral 220 and NoC 214 to ensure that the temporal separation between NoC 212 and NoC 214 is consistent.

Figure 3:
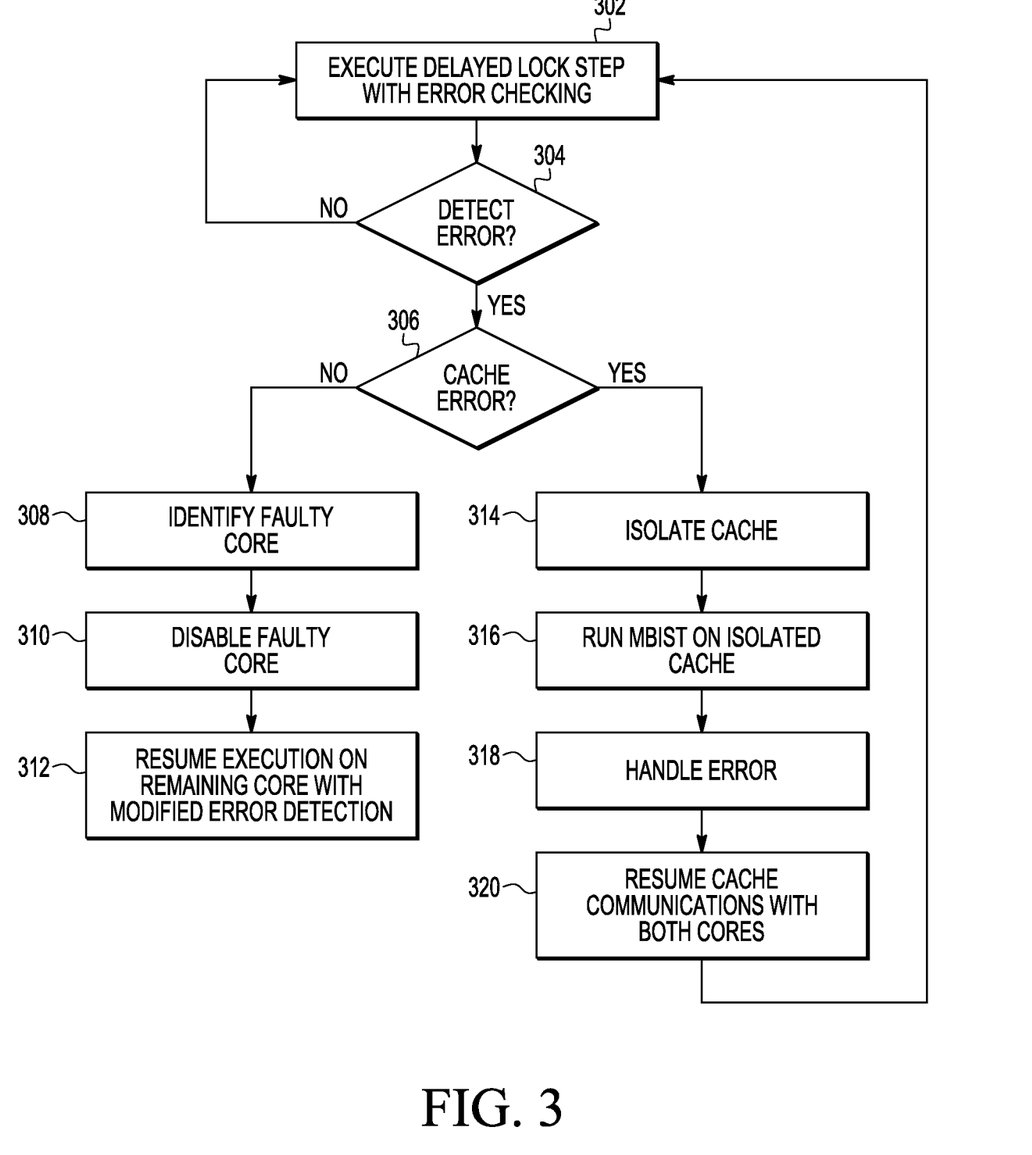
FIG. 3 illustrates information and control flows for the exemplary fail-operational computing system of FIG. 2 consistent with at least one embodiment of the invention.

Referring to FIGS. 2 and 3, cores 202 and 204 of dual channel fail-operational system 200 execute delayed lock-step operations with validation of results (302). Cores 202 and 204 continue to execute delayed lockstep operations until at least one of the cores detects an error (304). Note that multiple error sources may trigger errors in core 202 and core 204. Validation module 203 or validation module 209 indicating a difference in execution between leading or trailing channels due to transient error (e.g., a voltage spike, clock glitch, etc.) or permanent fault (e.g., electrical overstress (EOS), or latent defect not detected during manufacturing test). For example, cache controllers in cores 202 and 204 may provide an indication of an error in local memory and validation module 203 may provide an indication of a synchronization error in the results provided by cores 202 and 204 (e.g., the results of delayed lockstep operation of redundant cores do not match). In at least one embodiment of dual channel fail-operational system 200, each of the error sources triggers an interrupt in core 202 and core 204. An error interrupt service routine determines a type of error and proceeds accordingly. In at least one embodiment, validation module 203 provides an cell or code to cores 202 and 204 and cache controllers 205 and 207 generate a distinct error code in cores 202 and 204, respectively. In at least one embodiment of dual channel fail-operational system 200, vectored interrupts are used and a different interrupt service routine executes for each interrupt generated by a different source (e.g., interrupt generated by the cache controller, interrupt generated by the validation module, or other interrupt). In at least one embodiment of dual channel fail-operational system 200, an error indicator enables logic built-in self-test (LBIST) to determine if a permanent error occurred in a particular part of the redundant system.

In at least one embodiment, the interrupt handling routine pauses execution of the core in which it executes. Then the interrupt handling routine may initiate MBIST, or read an error code associated with MBIST executed by the corresponding cache controller, to determine whether the error is a soft cache error (306). If the error is not a soft cache error, but rather a validation error, then the interrupt handling routine executes an error handler (e.g., a handler including LBIST) to determine whether the core or associated channel is faulty (308). If the core or associated channel is faulty, the interrupt handling routine disables the core (310). If the core or associated channel is not faulty. The interrupt handling routine returns from the interrupt and normal execution resumes (312). As a result of a faulty core or associated channel being disabled and the other core resuming operation, dual channel fail-operational system 200 continues operations in a non-redundant mode that corresponds to a lower Safety Integrity Level.

If the error handler determines that the error is a soft error in the local memory (306), then the error handler isolates the local memory from the core or associated channel and the leading core triggers MBIST on the isolated cache (316) to identify and correct the error. The error handler may correct or otherwise handle a soft error by inverting an erred bit or by invalidating a line of the cache (318). Then, the error handler resumes communications between the local memory and the associated core. The interrupt service routine executes a return from interrupt, thereby triggering resumption of normal program execution in the core. Since the secondary core experiences the same soft error in the cache, the secondary core will execute the interrupt service routine in delayed lockstep. When the interrupt service routine executing in the secondary core (i.e., the delayed execution core) returns from interrupt and triggers resumption of normal program execution, delayed lockstep execution of the system resumes (320). Thus, by sharing the cache, both cores experience the same soft error, execute the same error handler, and loss of synchronization does not occur. Therefore, no system reset is required to handle the soft error. Accordingly, the time for handling a soft error in dual channel fail-operational system 200 may be orders of magnitude less than techniques that require a system reset, thereby increasing the availability of dual channel fail-safe system 200 as compared to other error handling techniques. In addition, sharing the cache or other local memory reduces system memory requirements, which reduces die size and power consumption for a dual channel fail-operational system.

Figure 4:
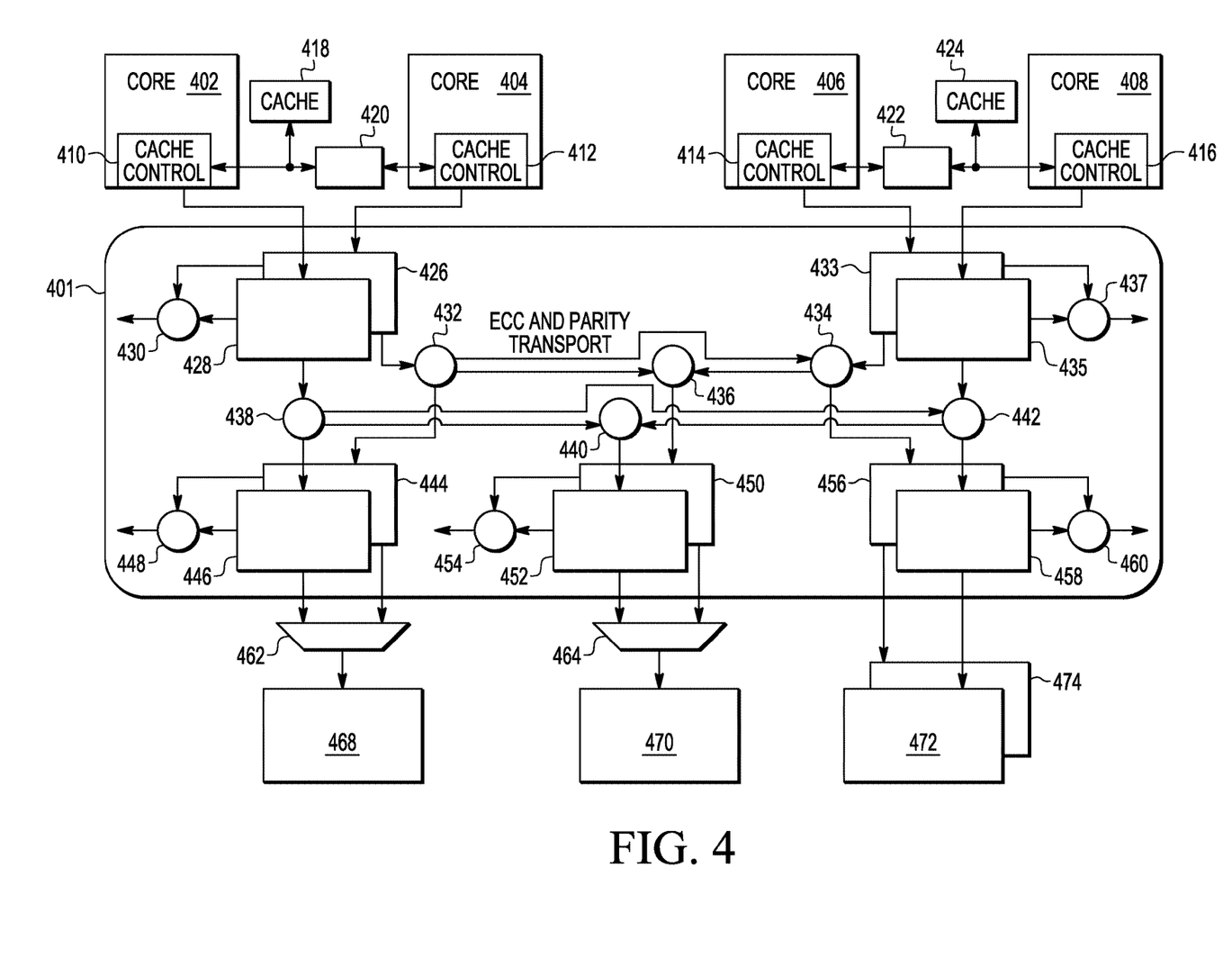
FIG. 4 illustrates a functional block diagram of an exemplary fail-operational computing system including a redundant network-on-a-chip (NoC) and redundant peripherals consistent with at least one embodiment of the invention.

Referring to FIG. 4, in at least one embodiment of a fail-operational system, core 402 is configured as a primary core and core 404 is configured as a validation core, which executes in delayed lockstep with core 402. Core 402 accesses cache 418. Core 402 receives results of the accesses with a first latency and core 404 receives the results separately with a second latency via delay element 420. Delay element 420 delays the results a number of cycles that correspond to the delay in lockstep execution. In this delayed lockstep configuration, only accesses from the primary core change a state of the cache 418. In at least one embodiment of the fail-operational system, writes to cache 418 from core 402 are committed in response to validation with results of core 404 by a validation module (not shown). Cores 406 and 408 and cache 424 may be configured to execute similarly using delay element 422.

In at least one embodiment, fail-operational system 400 includes cores 402 and 404 and multiple other bus master elements, which may be configured to operate redundantly in delayed lockstep or independently with respect to one another. That configurability, permits selectively trading off between safety and performance aspects. When configured to operate redundantly, these system architectures may perform delayed lock step accesses to other modules of the network, as described above, or single accesses that are replicated externally to achieve redundant storage, In at least one embodiment of a fail-operational system, an NoC 401 includes redundant network elements forming redundant communications paths (which may include redundant paths for both instructions and data) between peripheral 468 and to main memory 470 or to redundant peripherals 472 and 474. For example, core 402 may inject messages into the primary network (e.g., the primary network including switches 438, 440, and 442) via network element 428 and redundant core 404 injects messages into the secondary network (e.g., the secondary network including switches 432, 434, and 436) via a corresponding, redundant network element 426. Switches 432, 434, 436, 438, 440, and 442 may be crossbar switches or other suitable switches. Network elements 426 and 428 may convert the messages into messages having a suitable bus protocol that includes ECC and parity transport, or perform other suitable operation. Similarly, network elements 433 and 435 convert redundant network messages from core 406 and redundant core 408, respectively, into messages having the suitable network protocol for transmission with ECC and parity bits using the primary network and the secondary network, respectively. Network elements 446 and 444, 452 and 450, and 456 and 458 may convert messages from a bus protocol to another message protocol suitable for a target peripheral or memory. Validation modules 430, 437, 448, 454, and 460 determine whether an error has occurred in the redundant communications paths, and generates indicators thereof. Those indicators may be provided to a network controller that can reconfigure the network by disabling a faulty element to operate the network at a lower Safety integrity Level in response to corresponding error. Similar to the techniques described above, network elements 426, 428, 433, and 435 may correct errors detected in the bus protocol conversion or configure the redundant network elements 428 and 426 in a modified mode where a faulty network path is disabled, while the other network path resumes communication and the system operates at a lower Safety Integrity Level.

A network controller (not shown) may provide control signals to select elements 462 and 464 to output results from a selected one of the primary or secondary network to peripheral 468 and main memory 470, respectively that is not redundant. Those select signals may be based on the outputs of validation modules, based on a predetermined configuration, or a combination thereof. In embodiments where a target peripheral or memory is also redundant, the primary network provides the request to primary peripheral 472 and the secondary network provides the request to secondary peripheral 474.

Figure 5:
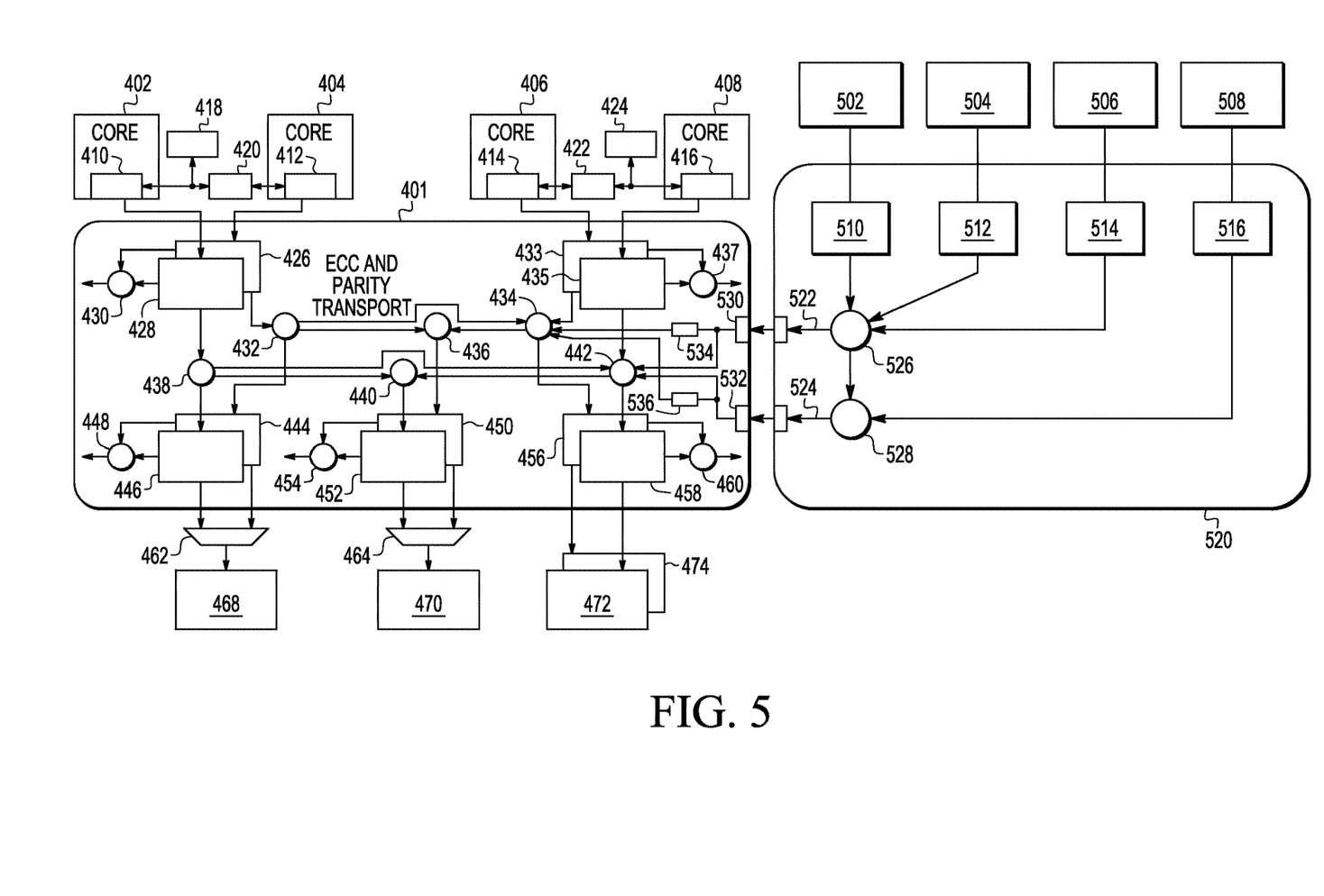
FIG. 5 illustrates a functional block diagram of an exemplary fail-operational computing system including a redundant NoC and redundant peripherals coupled to a non-redundant network and computing modules consistent with at least one embodiment of the invention.

Referring to FIG. 5, in at least one embodiment of NoC 401, non-redundant bus masters 502, 504, 506, and 508 are coupled to non-redundant network elements 510, 512, 514, and 516, which may convert the network messages to messages having an appropriate bus protocol and provide those messages to switches 526 and 528. Switches 526 and 528 are coupled to ports 522 and 524, without redundancy. Ports 530 and 532 receive communications from ports 522 and 524 and each of ports 530 and 532 duplicate the communications for injection into the redundant network. The secondary network introduces a delay into duplicated messages being communicated using the secondary paths, e.g., using delay elements 534 and 536. Referring to FIGS. 4 and 5, embodiments of a fail-operational system include duplicated cores and result validation, as well as duplicated communications paths and result validation between the individual cores and peripherals or memory. The result validation may detect a permanent error in components of the leading channel or following channel, then the faulty, channel may be disabled allowing the other channel to continue executing the application with full performance, but reduced safety level. In an exemplary automotive application (e.g., in electric vehicles without a mechanical backup system), the fail-operational system allows a vehicle to continue operation when shutting down a faulty module is not acceptable. Thus, fail-operational system may increase the safety integrity level of redundant and non-redundant bus masters.

In at least one embodiment of the disclosure, a method includes detecting an error in a local memory shared by redundant computing modules executing in delayed lockstep. The method includes pausing execution in the redundant computing modules and handling the error in the local memory. The method includes resuming execution in delayed lockstep of the redundant computing modules in response to the handling of the error. The method may include detecting a second error based on delayed lockstep outputs of the redundant computing modules, isolating a faulty computing module of the redundant computing modules from the local memory, and resuming execution in another of the redundant computing modules. Handling the error may include invalidating a line in the local memory corresponding to the error. The error may be a soft error and handling the error may include correcting the soft error by changing a bit in the local memory corresponding to the soft error. The method may include executing a built-in self-test (BIST) and generating an indicator thereof. The method may include communicating a memory request between a first computing module of the redundant computing modules and main memory, and communicating the memory request between a second computing module of the redundant computing modules and main memory. The method may include communicating between a first computing module of the redundant computing modules and a first peripheral and communicating between a second computing module of the redundant computing modules and a second peripheral, redundant to the first peripheral. The second peripheral may execute in delayed lockstep with the first peripheral. The method may include detecting a second error in the communications between the redundant computing modules and the first and second peripherals. The method may include disabling communications between one of first and second computing modules of the redundant computing modules and a corresponding one of the first and second peripherals in response to detecting the second error. The method may include providing data from a computing module to a leading channel of a redundant network. The method may include providing a delayed version of the data from the computing module to a following channel of the redundant network, and communicating the data and the delayed version of the data to a target module.

In at least one embodiment of the disclosure, an apparatus includes a first computing module comprising a first local memory controller. The apparatus includes a second computing module redundant to the first computing module and configured to execute in delayed lockstep with the first computing module, the second computing module comprising a second local memory controller. The apparatus includes a local memory coupled to the first and second local memory controllers. The first and second local memory controllers are configured to generate indications of an error in the local memory, the first and second computing modules being configured to pause delayed lockstep execution in response to the indication, and resume delayed lockstep execution of the first and second computing modules in response to handling of the error in the local memory. The apparatus may include a validation module configured to provide a validation error indicator to at least one of the first and second computing modules in response to a comparison error based on delayed lockstep outputs of the first and second computing modules and a faulty one of the first computing module and the second computing module is isolated from the local memory in response to the indicator. The apparatus may include an error handler in one of the first and second computing modules configured to handle the error by invalidating a line in the local memory. The apparatus may include an error handler in one of the first and second computing modules configured to handle the error by changing a bit in the local memory to correct the error. The local memory may be configured to execute a built-in self-test (MST) and generate an indicator thereof and the error may be detected based on the indicator. The apparatus may include a network-on-a-chip. The network-on-a-chip may include a leading channel coupled between the first computing module and main memory. The network-on-a-chip may include a following channel redundant to the leading channel. The following channel may be coupled between the second computing module and main memory. The network-on-a-chip may include a network validation module configured to detect a discrepancy between data in the leading channel and the following channel. The network validation module may be configured to disable at least a portion of a failing one of the leading channel and the following channel in response to detecting the error. The network-on-a-chip may include a first port coupled to the leading channel and a second port coupled to the following channel. The first port and the second port may be configured to provide redundant, synchronized signals from a non-redundant module to the leading and following channels. The apparatus may include a network-on-a-chip including a leading channel coupled between the first computing module and a first peripheral and a following channel redundant to the leading channel, the following channel being coupled between the second computing module and a second peripheral redundant to the first peripheral configured for delayed lockstep execution. The network-on-a-chip may include a network validation module configured to detect a discrepancy between data in the leading channel and the following channel and generate an indicator thereof.

In at least one embodiment of the disclosure, an apparatus includes redundant computing modules configured to execute in delayed lockstep, a local memory shared by the redundant computing modules, and means for detecting an error in the local memory, pausing execution in the redundant computing modules, handling the error of the local memory, and resuming execution in delayed kickstep of the redundant computing modules in response to be handling of the error. The apparatus may include means for redundantly communicating between the redundant computing modules and another computing device.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test, or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSIT data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Although the invention is described herein with reference to specific embodiments, various modifications and changes can be made without departing from the scope of the present invention as set forth in the claims below. While the invention has been described in embodiments in which an element is duplicated one to achieve redundancy, one of skill in the art will appreciate that the teachings herein can be utilized with a plurality of duplicates for that element. In addition, while the invention has been described in embodiments in which the fail-operational system is implemented as an integrated NoC or SoC, one of skill in the art will appreciate that the teachings herein can be utilized with networks of elements implemented on separate integrated circuit substrates. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   detecting an error in program execution by redundant computing modules executing a program in delayed lockstep;
   pausing program execution in the redundant computing modules in response to detecting the error;
   during paused program execution, handling the error according to a determination of whether the error is a soft error in a local memory shared by the redundant computing modules;
   in response to the determination indicating that the error is a soft error, resuming program execution in delayed lockstep of the redundant computing modules after the handling of the error; and
   in response to the determination indicating that the error is not a soft error, identifying a faulty computing module of the redundant computing modules, disabling the faulty computing module, and resuming program execution in another computing module of the redundant computing modules.

2. The method, as recited in claim 1, wherein the error is a soft error and handling the error comprises:
   invalidating a line in the local memory corresponding to the soft error.

3. The method, as recited in claim 1, wherein the error is a soft error and handling the error comprises:
   correcting the soft error by changing a bit in the local memory corresponding to the soft error.

4. The method, as recited in claim 1, wherein detecting the error comprises:
   executing a built-in self-test (BIST) and generating an indicator thereof.

5. The method, as recited in claim 1, further comprising:
   communicating a memory request between a first computing module of the redundant computing modules and main memory; and
   communicating the memory request between a second computing module of the redundant computing modules and the main memory.

6. The method, as recited in claim 1, further comprising:
   communicating between a first computing module of the redundant computing modules and a first peripheral; and
   communicating between a second computing module of the redundant computing modules and a second peripheral, redundant to the first peripheral, the second peripheral executing in delayed lockstep with the first peripheral.

7. The method, as recited in claim 6, further comprising:
   detecting a second error in the communications between the redundant computing modules and the first and second peripherals; and
   disabling the communications between one of first and second computing modules of the redundant computing modules and a corresponding one of the first and second peripherals in response to detecting the second error.

8. The method, as recited in claim 1, further comprising:
   providing data from a computing module of the redundant computing modules to a leading channel of a redundant network;

providing a delayed version of the data from the computing module to a following channel of the redundant network; and communicating the data and the delayed version of the data to a target module.

9. An apparatus comprising:
a first computing module comprising a first local memory controller;
a second computing module redundant to the first computing module and configured to execute a program in delayed lockstep with the first computing module, the second computing module comprising a second local memory controller; and
a local memory coupled to the first and second local memory controllers,
wherein the first and second local memory controllers are configured to detect an error in program execution, the first and second computing modules are configured to pause delayed lockstep program execution in response to detection of the error, the first and second computing modules are configured to handle the error according to a determination of whether the error is a soft error in the local memory, the first and second computing modules are configured to resume program execution in delayed lockstep after the handling of the error in response to the determination indicating that the error is a soft error, and the first and second computing modules are configured to identify a faulty computing module of the redundant computing modules, disable the faulty computing module, and resume program execution in another computing module of the redundant computing modules in response to the determination indicating that the error is not a soft error.

10. The apparatus, as recited in claim 9, further comprising:
a validation module configured to provide a validation error indicator to at least one of the first and second computing modules in response to a comparison error based on delayed lockstep outputs of the first and second computing modules and a faulty one of the first computing module and the second computing module is isolated from the local memory in response to the validation error indicator.

11. The apparatus, as recited in claim 9, further comprising:
an error handler in one of the first and second computing modules configured to handle the error by invalidating a line in the local memory in response to the determination indicating the error is a soft error.

12. The apparatus, as recited in claim 9, further comprising:
an error handler in one of the first and second computing modules configured to handle the error by changing a bit in the local memory to correct the error in response to the determination indicating the error is a soft error.

13. The apparatus, as recited in claim 9, wherein the local memory is configured to execute a built-in self-test (BIST) and generate an indicator thereof, the error being detected based on the indicator.

14. The apparatus, as recited in claim 9, further comprising:
a network-on-a-chip comprising:
a leading channel coupled between the first computing module and main memory;
a following channel redundant to the leading channel, the following channel being coupled between the second computing module and main memory; and
a network validation module configured to detect a discrepancy between data in the leading channel and the following channel.

15. The apparatus, as recited in claim 14, wherein the network validation module is configured to disable at least a portion of a failing one of the leading channel and the following channel in response to detecting the discrepancy.

16. The apparatus, as recited in claim 14, wherein the network-on-a-chip further comprises:
a first port coupled to the leading channel; and
a second port coupled to the following channel,
wherein the first port and the second port are configured to provide redundant, synchronized signals from a non-redundant module to the leading and following channels.

17. The apparatus, as recited in claim 9, further comprising:
a network-on-a-chip comprising:
a leading channel coupled between the first computing module and a first peripheral;
a following channel redundant to the leading channel, the following channel being coupled between the second computing module and a second peripheral redundant to the first peripheral configured for delayed lockstep execution; and
a network validation module configured to detect a discrepancy between data in the leading channel and the following channel and generate an indicator thereof.

18. An apparatus comprising:
redundant computing modules configured to execute a program in delayed lockstep;
a local memory shared by the redundant computing modules; and
means for detecting an error in the local memory, pausing program execution in the redundant computing modules in response to detecting the error, handling the error during paused program execution according to a determination of whether the error is a soft error in the local memory, in response to the determination indicating that the error is a soft error, resuming program execution in delayed lockstep of the redundant computing modules after the handling of the error, and in response to the determination indicating that the error is not a soft error, identifying a faulty computing module of the redundant computing modules, disabling the faulty computing module, and resuming program execution in another computing module of the redundant computing modules.

19. The apparatus, as recited in claim 18, further comprising:
means for communicating redundant information between the redundant computing modules and another computing device.

20. The method, as recited in claim 1, wherein the local memory is responsive to redundant cache controllers of the redundant computing modules and the local memory is configured as a first-level cache in a memory system shared by the redundant computing modules.

21. The apparatus, as recited in claim 9, wherein the local memory is configured as a first-level cache in a memory system shared by the first and second computing modules and the first and second local memory controllers include a first cache controller and a second cache controller, respectively.

* * * * *